United States Patent
Hong et al.

(10) Patent No.: US 12,491,463 B2
(45) Date of Patent: Dec. 9, 2025

(54) AIR CLEANER

(71) Applicant: COWAY CO., LTD., Chungcheongnam-do (KR)

(72) Inventors: Hyun Jin Hong, Chungcheongnam-do (KR); Il Soo Jeon, Chungcheongnam-do (KR); In Kyu Back, Chungcheongnam-do (KR)

(73) Assignee: COWAY Co., Ltd., Chungcheongnam-do (KR)

( * ) Notice: Subject to any disclaimer, the term of this patent is extended or adjusted under 35 U.S.C. 154(b) by 527 days.

(21) Appl. No.: 17/964,987

(22) Filed: Oct. 13, 2022

(65) Prior Publication Data
US 2023/0201755 A1    Jun. 29, 2023

(30) Foreign Application Priority Data
Dec. 27, 2021   (KR) .................. 10-2021-0188705

(51) Int. Cl.
| | | |
|---|---|---|
| *B01D 46/681* | (2022.01) | |
| *B01D 46/00* | (2022.01) | |
| *B01D 46/10* | (2006.01) | |
| *B01D 46/48* | (2006.01) | |

(52) U.S. Cl.
CPC ....... *B01D 46/681* (2022.01); *B01D 46/0005* (2013.01); *B01D 46/10* (2013.01); *B01D 46/48* (2013.01)

(58) Field of Classification Search
None
See application file for complete search history.

(56) References Cited

U.S. PATENT DOCUMENTS

| | | | | |
|---|---|---|---|---|
| 1,687,428 A | * | 10/1928 | Corkran | B01D 29/6415 210/488 |
| 2,639,780 A | * | 5/1953 | Hardy | F23J 15/025 55/296 |
| 3,688,477 A | * | 9/1972 | Charles, Jr. | F24F 7/003 454/297 |

(Continued)

FOREIGN PATENT DOCUMENTS

| | | |
|---|---|---|
| CN | 102589046 A | 7/2012 |
| CN | 106123281 A | 11/2016 |

(Continued)

OTHER PUBLICATIONS

Substantive Examination Adverse Report of Corresponding Malaysia Application No. PI2022005077, issued Oct. 30, 2024 (6 pages).

(Continued)

*Primary Examiner* — Brit E. Anbacht
(74) *Attorney, Agent, or Firm* — Guntin & Gust, PLC; Miyoung Shin (57) ABSTRACT

The present disclosure is directed to an air cleaner capable of improving cleaning convenience of a filter module. The air cleaner includes a filter module detachably coupled to a housing. The filter module includes a detachable unit having a filter net in one portion and a cleaning unit configured to be relatively rotatable with respect to the filter net while at least a portion of the cleaning unit is in contact with the filter net. The cleaning unit is detachably coupled to a motor disposed in the housing when the detachable unit is coupled to the housing.

12 Claims, 10 Drawing Sheets

(56) References Cited

U.S. PATENT DOCUMENTS

| | | | | |
|---|---|---|---|---|
| 4,298,473 | A | * | 11/1981 | Wyman .................. B01D 33/50 |
| | | | | 210/396 |
| 4,439,218 | A | * | 3/1984 | Priepke .................. B01D 46/10 |
| | | | | 55/288 |
| 8,734,553 | B2 | * | 5/2014 | Sakashita .............. F24F 1/0063 |
| | | | | 55/296 |
| 11,433,345 | B2 | * | 9/2022 | Park ......................... F24F 11/30 |
| 2002/0088208 | A1 | * | 7/2002 | Lukac .................. A01B 51/026 |
| | | | | 55/385.3 |
| 2010/0107575 | A1 | * | 5/2010 | Zhang .................. B01D 46/681 |
| | | | | 55/289 |
| 2010/0192768 | A1 | * | 8/2010 | Kim ..................... B01D 46/681 |
| | | | | 55/296 |
| 2010/0258267 | A1 | * | 10/2010 | Sakashita ................ F24F 13/28 |
| | | | | 165/59 |
| 2018/0056221 | A1 | | 3/2018 | Tsutsumi |
| 2020/0155992 | A1 | | 5/2020 | Park |
| 2021/0071904 | A1 | * | 3/2021 | Park ..................... B01D 46/681 |
| 2023/0324057 | A1 | * | 10/2023 | Michaud ................. F24F 7/065 |
| | | | | 454/254 |

FOREIGN PATENT DOCUMENTS

| | | | | |
|---|---|---|---|---|
| CN | 207481616 | U | | 6/2018 |
| CN | 108474573 | A | | 8/2018 |
| CN | 115000828 | A * | 9/2022 | ............. B01D 46/12 |
| JP | H0857233 | A | | 3/1996 |
| JP | 2007130628 | A | | 5/2007 |
| KR | 10-20090051635 | A | | 5/2009 |
| KR | 100975573 | B1 | | 8/2010 |
| KR | 10-20110035636 | A | | 4/2011 |
| KR | 102100075 | B1 | | 4/2020 |
| KR | 10-2257376 | B1 | | 5/2021 |
| KR | 10-20210090266 | A | | 7/2021 |
| KR | 1020210154284 | A | | 12/2021 |

OTHER PUBLICATIONS

Chinese Office Action of Counterpart Chinese Application No. 202211184139.7 issued Mar. 22, 2025 (7 pages).

* cited by examiner

AIR CLEANER

CROSS-REFERENCE TO RELATED APPLICATION

The present application claims priority to and the benefit of Korean Patent Application No. 10-2021-0188705, filed on Dec. 27, 2021, the disclosure of which is incorporated herein by reference in its entirety.

TECHNICAL FIELD

The present disclosure relates to an air cleaner, and more particularly, to an air cleaner capable of improving cleaning convenience of a filter module.

BACKGROUND

An air cleaner refers to a device that purifies contaminated air and purifies the contaminated air into fresh air. The air introduced into the air cleaner may pass through a filter, and dust, impurities, etc. in the air may be removed.

In general, a filter provided in an air cleaner filters foreign substances having a predetermined size or more among foreign substances floating in the air. Therefore, as the operation time of the air cleaner elapses, foreign substances may be attached to the surface of the filter.

The foreign substances attached to the filter surface may increase the load of the air cleaner and reduce air purification efficiency. Accordingly, periodic cleaning of the filter surface may be required for continuous use of the filter.

In a conventional air cleaner, a user needs to manually remove foreign substances attached to a filter surface after separating the filter from the housing. That is, a user's cumbersome manual operation is involved in the cleaning process of the filter.

Therefore, the development of an air cleaner that is easy to clean and manage a filter may be considered.

Korean Patent Laid-Open Publication No. 10-2021-0154284 discloses a ventilation type air cleaner and operating method thereof. Specifically, it discloses a ventilation type air cleaner including a filter member detachably disposed at one side of an outside air inlet.

However, this type of air cleaner merely discloses a structure for a replaceable filter member, and does not disclose a structure for management for continuous use and recycling of the filter member.

Korean Patent Registration No. 10-2100075 discloses a ventilation system for management of filter and prevention of decline of airflow capacity. Specifically, it discloses a ventilation system for managing according to a replacement and cleaning time of a filter and for correcting when the airflow volume of the ventilation system is reduced due to the aging of the filter.

However, this type of ventilation system may determine a cleaning time of the filter, and separation and cleaning of the filter should still be manually performed by the user.

SUMMARY

Technical Problem

According to one aspect of the present disclosure, the present disclosure is directed to providing an air cleaner capable of improving cleaning convenience of a filter module.

According to another aspect of the present disclosure, the present disclosure is directed to providing an air cleaner capable of easily maintaining a cleaning unit provided in a filter module.

According to yet another aspect of the present disclosure, the present disclosure is directed to providing an air cleaner in which a filter module and a housing can be more easily detached.

Technical Solution

The air cleaner according to an aspect of the present disclosure includes a housing in which an inlet and an outlet of air are formed; and a filter module disposed at one side of the inlet to filter air flowing toward the inlet, wherein the filter module includes a detachable unit having a filter net at a portion thereof and detachably coupled to the housing; and a cleaning unit configured to be relatively rotatable with respect to the filter net while at least a portion of the cleaning unit is in contact with the filter net, wherein the cleaning unit is detachably coupled to a motor disposed in the housing when the detachable unit is coupled to the housing.

In addition, the detachable unit may be moved in a first direction when detached from the housing and the cleaning unit may be moved in a second direction different from the first direction when detached from the motor.

In addition, wherein the housing may include a close contact unit configured to move the detachable unit in a direction toward the motor when the detachable unit is coupled to the housing.

In addition, the close contact unit may include a pressing plate which is in surface contact with the detachable unit when the detachable unit is detached from the housing; and an elastic member which provides an elastic force to move the pressing plate in a direction toward the motor.

In addition, the pressing plate may include a pillar part formed extending from one surface of the pressing plate in a direction away from the motor, and the elastic member may be a spring disposed to surround the outer circumference of the pillar part.

In addition, the cleaning unit may include a cleaning bar detachably coupled to the filter net and connected to the motor to be rotatable; and a brush configured to be coupled to one side of the cleaning bar facing the filter net and rotatable together with the cleaning bar when the cleaning bar is rotated, and be relatively rotatable with respect to the filter net while at least a portion of the brush is in contact with the filter net.

In addition, the brush may be slidably and detachably coupled to the cleaning bar.

In addition, the cleaning unit may include a fixing member coupled with the cleaning bar and the filter net interposed therebetween.

In addition, the cleaning bar may include a plurality of wing parts extending radially outward from a rotation axis.

In addition, the detachable unit may include a dust tray disposed below the cleaning unit and having a space therein in which dust separated from the filter net is collected.

In addition, the dust tray may be formed to extend downward from the filter net and be integrally formed with the filter net.

In addition, the dust tray may be detachably coupled to a lower side of the filter net.

In addition, the cleaning unit may include a motor connecting shaft into which the rotating shaft of the motor is inserted and coupled and rotatable together with the rotating shaft when the rotating shaft is rotated.

Advantageous Effects

Among the various effects of the present disclosure, the effects that can be obtained through the above-described solution are as follows.

First, the air cleaner includes a housing and a filter module detachably coupled to the housing. The filter module includes a cleaning unit configured to be relatively rotatable with respect to a filter net while at least a portion of the cleaning unit is in contact with the filter net.

Therefore, dust attached to the surface of the filter net can be automatically removed from the filter net by the cleaning unit. In this case, the dust separated from the filter net is moved to the inner space of the dust tray located below the filter module. Accordingly, the user may perform cleaning of the filter module by removing the dust collected in the dust tray. As a result, the cleaning convenience of the filter module can be further improved, and the cleanliness of the filter module can be maintained even at normal times.

In addition, the cleaning unit includes a cleaning bar connected to a motor to be rotatable and a brush rotatable relative to a filter net while being in contact with the filter net. In addition, the brush may be slidably and detachably coupled to the cleaning bar.

Accordingly, the brush may be easily separated from the cleaning bar and cleaned. This facilitates maintenance of the cleaning unit, including the brush.

In addition, the filter module includes a detachable unit detachably coupled to the housing. When the detachable unit is detached from the housing, the detachable unit is moved in a first direction. When the detachable unit is coupled to the housing, the pressing plate of the housing moves the detachable unit in a direction toward the motor, which is a direction different from the first direction.

Therefore, the cleaning unit of the filter module and the motor can be detached by the pressing plate even with a small force. Accordingly, the filter module and the housing can be more easily detached. At the same time, when the filter module and the housing are coupled to each other, arbitrary separation of the filter module can be prevented.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Hereinafter, the air cleaner 1 according to an exemplary embodiment of the present disclosure will be described in more detail with reference to the accompanying drawings.

In the following description, in order to clarify the features of the present disclosure, descriptions of some components may be omitted.

In this specification, even in different embodiments, the same reference numerals may designate the same elements, and a redundant description thereof will be omitted.

The accompanying drawings are only for easy understanding of the embodiments disclosed herein, and the technical ideas disclosed herein are not limited by the accompanying drawings.

Expressions in the singular include plural expressions unless the context clearly indicates otherwise.

Figure 1:
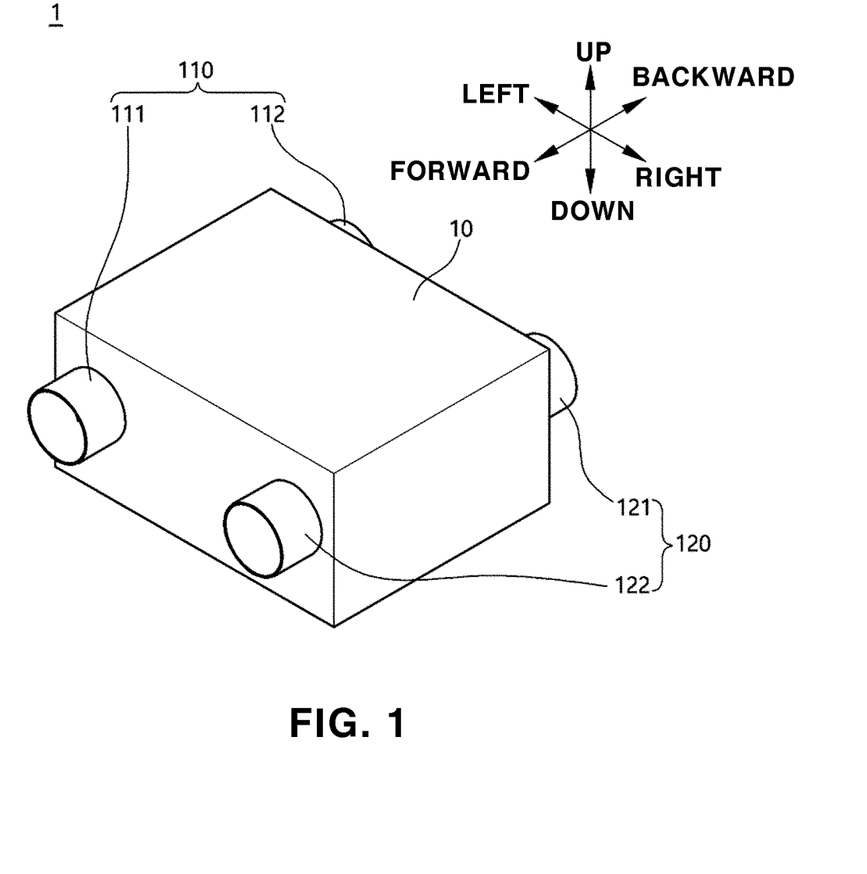
FIG. 1 is a perspective view illustrating an air cleaner according to an exemplary embodiment of the present disclosure.
Figure 2:
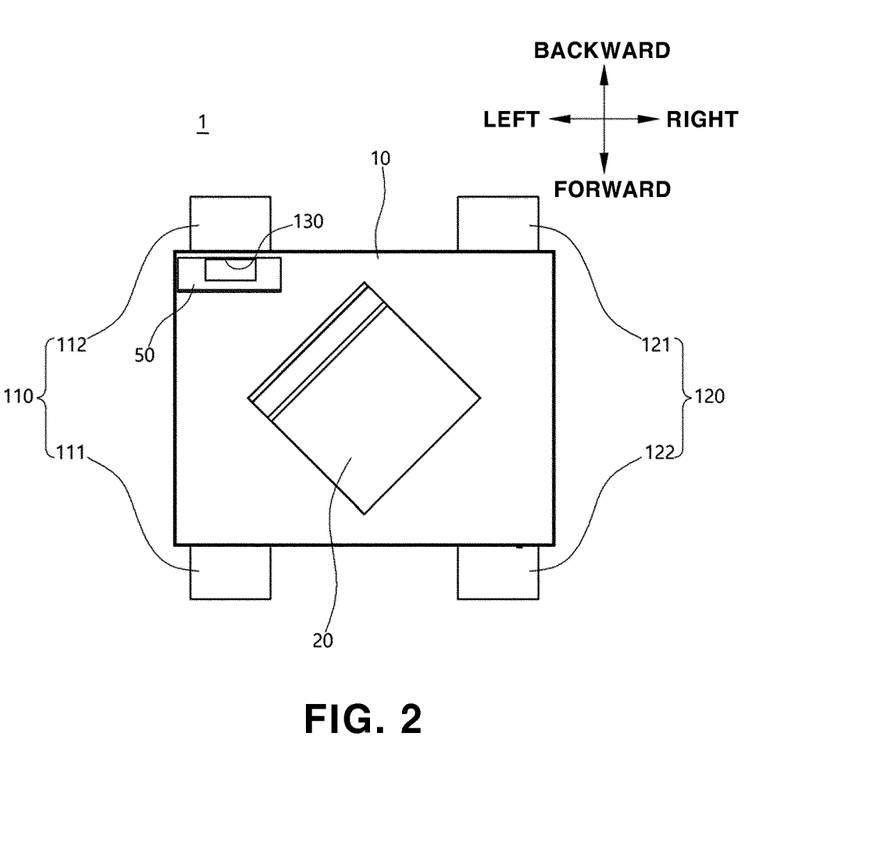
FIG. 2 is a bottom view illustrating the air cleaner of FIG. 1.
Figure 5:
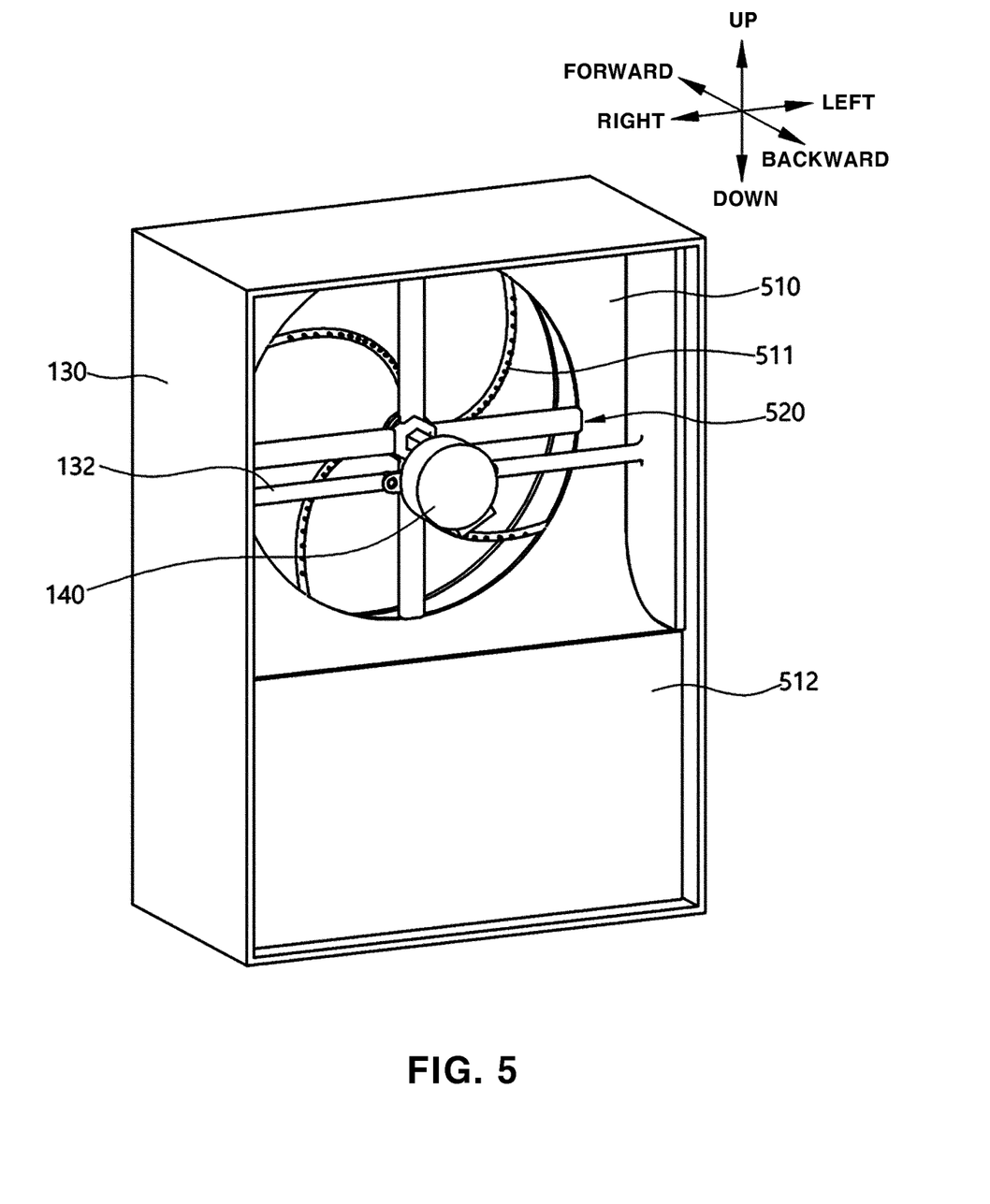
FIG. 5 is a perspective view illustrating the filter mounting part, the close contact unit, and the filter module of FIG. 4 in different directions.

The terms "upward", "downward", "below", "lower side", "left side", "right side", "front side", "rearward" and "rear side" used in the following description will be understood with reference to the coordinate system shown in FIGS. 1, 2, and 5.

Figure 3:
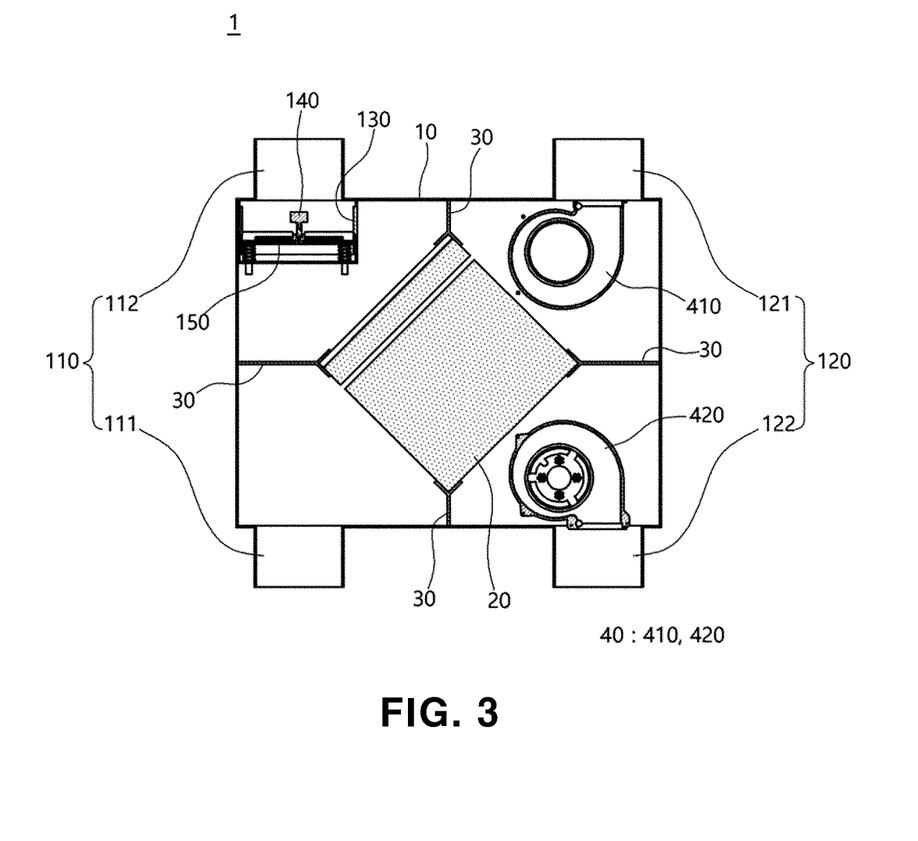
FIG. 3 is a plan and cross-sectional view illustrating the air cleaner of FIG. 1.

Hereinafter, an air cleaner 1 according to an exemplary embodiment of the present disclosure will be described with reference to FIGS. 1 to 3.

The air cleaner 1 purifies contaminated air and purifies the contaminated air into fresh air. Specifically, the air cleaner 1 sucks contaminated air into the inside, purifies the air, and discharges fresh air to the outside.

The air cleaner 1 removes dust, impurities, and the like in the air passing through the air cleaner 1. In an embodiment, the air cleaner 1 may filter foreign substances having a predetermined size or more among the foreign substances in the air. In other embodiment, the air cleaner 1 may adsorb and remove a specific material included in the air.

In addition, the air cleaner 1 may perform an air cleaning function and a ventilation function at the same time through forced circulation between the inside air and the outside air.

In the illustrated embodiment, the air cleaner 1 includes a housing 10, a heat exchange part 20, a guide part 30, a fan part 40, and a filter module 50.

The housing 10 forms the exterior of the air cleaner 1.

A space through which the outside air and the inside air may flow is formed inside the housing 10. Accordingly, the outside air and the inside air introduced into the housing 10 may circulate through the space and then be discharged to the outside of the housing 10.

The housing 10 may be formed of a high-strength material. For example, the housing 10 may be formed of a metal material.

In the illustrated embodiment, the housing 10 includes an inlet 110, an outlet 120, a filter mounting part 130, a motor 140, and a close contact unit 150.

The inlet 110 functions as an entrance of air flowing toward the inside of the housing 10.

The inlet 110 is disposed at one side of the housing 10 and communicates the inner and outer spaces of the housing 10.

The inlet 110 includes an inside air inlet 111 and an outside air inlet 112. The inside air inlet 111 and the outside air inlet 112 each function as an entrance of inside air and outside air flowing toward the inside of the housing 10.

In addition, the inside air inlet 111 and the outside air inlet 112 are spaced apart from each other. In the illustrated embodiment, the inside air inlet 111 and the outside air inlet 112 are located at the front left side and rear left side of the housing 10, respectively.

The outlet 120 functions as a discharge path of air flowing toward the outside from the inside of the housing 10.

The outlet 120 is disposed at the other side of the housing 10 and is disposed to be spaced apart from the inlet 110. In addition, the outlet 120 communicates the inner and outer spaces of the housing 10.

The outlet 120 includes an inside air outlet 121 and an outside air outlet 122. The inside air outlet 121 and the outside air outlet 122 each function as a discharge path of inside air and outside air flowing toward the outside from the inside of the housing 10.

In addition, the inside air outlet 121 and the outside air outlet 122 are spaced apart from each other. In the illustrated embodiment, the inside air outlet 121 and the outside air outlet 122 are located at the rear right side and the front right side of the housing 10, respectively.

The filter mounting part 130 provides a space in which the filter module 50 to be described below is installed.

The filter mounting part 130 is adjacent to the outside air inlet 112. In addition, the filter mounting part 130 overlaps with the outside air inlet 112 in the inflow direction of the air passing through the outside air inlet 112. Accordingly, the air passing through the outside air inlet 112 may pass through the filter mounting part 130 and may be introduced into the housing 10.

The filter mounting part 130 is connected to the motor 140 and the close contact unit 150, respectively.

The motor 140 transmits power to the filter module 50 when connecting to the filter module 50 to be described below. In addition, the close contact unit 150 applies a force to the filter module 50 and assists the connection between the motor 140 and the filter module 50. A detailed description thereof will be described later.

The air introduced into the housing 10 flows toward the heat exchange part 20.

The heat exchange part 20 performs heat exchange between the inside air and the outside air introduced into the housing 10.

The heat exchange part 20 recovers the waste heat of the inside air and transmits the same to the outside air when the inside air and the outside air forcibly circulate. Through this, the inflow outside air may be sterilized and humidified, and more clean inside air may be provided to the inside.

The heat exchange part 20 is spaced apart from the inlet 110 and the outlet 120. In the illustrated embodiment, the heat exchange part 20 is disposed at the center of the inner space of the housing 10.

The guide part 30 guides a flow path of the inside air and the outside air passing through the heat exchange part 20.

The guide part 30 guides the inside air passing through the inside air inlet 111 to flow toward the heat exchange part 20. Thereafter, the guide part 30 guides the inside air passing through the heat exchange part 20 to flow toward the inside air outlet 121.

In addition, the guide part 30 guides the outside air passing through the outside air inlet 112 to flow toward the heat exchange part 20. Thereafter, the guide part 30 guides the outside air passing through the heat exchange part 20 to flow toward the outside air outlet 122.

In the illustrated embodiment, the guide part 30 divides the space inside the housing 10 into four spaces based on the heat exchange part 20. Accordingly, the guide part 30 may block the flow of inside air or outside air leaving the preset flow path.

However, the guide part 30 is not limited to the illustrated structure, and may be formed in various structures capable of guiding a flow path of inside air and outside air.

The inflow of the inside air and the outside air may be performed by the fan part 40.

The fan part 40 sucks air outside the housing 10 into the housing 10 and allows the sucked air to pass through the inner space of the housing 10 and then be discharged to the outside of the housing 10.

The fan part 40 is adjacent to the outlet 120. In addition, the fan part 40 overlaps the outlet 120 in a discharge direction of the air passing through the outlet 120. Accordingly, the air passing through the outlet 120 may pass through the fan part 40 and be discharged to the outside of the housing 10.

In the illustrated embodiment, the fan part 40 includes an air supply fan 410 and an exhaust fan 420.

The air supply fan 410 sucks the inside air outside the housing 10 into the housing 10 and allows the sucked inside air to pass through the inner space of the housing 10 and then be discharged to the outside of the housing 10.

The air supply fan 410 is adjacent to the inside air outlet 121. In addition, the air supply fan 410 overlaps the inside air outlet 121 in a discharge direction of the inside air passing through the inside air outlet 121. Accordingly, the air passing through the inside air outlet 121 may pass through the air supply fan 410 and be discharged to the outside of the housing 10.

The exhaust fan 420 sucks the outside air outside the housing 10 into the housing 10 and allows the sucked outside air to pass through the inner space of the housing 10 and then be discharged to the outside of the housing 10.

The exhaust fan 420 is adjacent to the outside air outlet 122. In addition, the exhaust fan 420 overlaps the outside air outlet 122 in a discharge direction of the outside air passing through the outside air outlet 122. Accordingly, the air passing through the outside air outlet 122 may pass through the exhaust fan 420 and be discharged to the outside of the housing 10.

The outside air introduced by the exhaust fan 420 passes through the filter module 50 and is introduced into the housing 10.

The filter module 50 filters the air flowing toward the outside air inlet 112. In an embodiment, the filter module 50 may remove foreign substances such as dust and impurities floating in the air and may adsorb harmful gases.

The filter module 50 is detachably coupled to the filter mounting part 130 of the housing 10. As described above, since the filter mounting part 130 is adjacent to the outside air inlet 112, the filter module 50 may be disposed at one side of the outside air inlet 112.

When the filter module 50 is inserted into the filter mounting part 130, the filter module may be pressed by the close contact unit 150 and connected to the motor 140.

Figure 4:
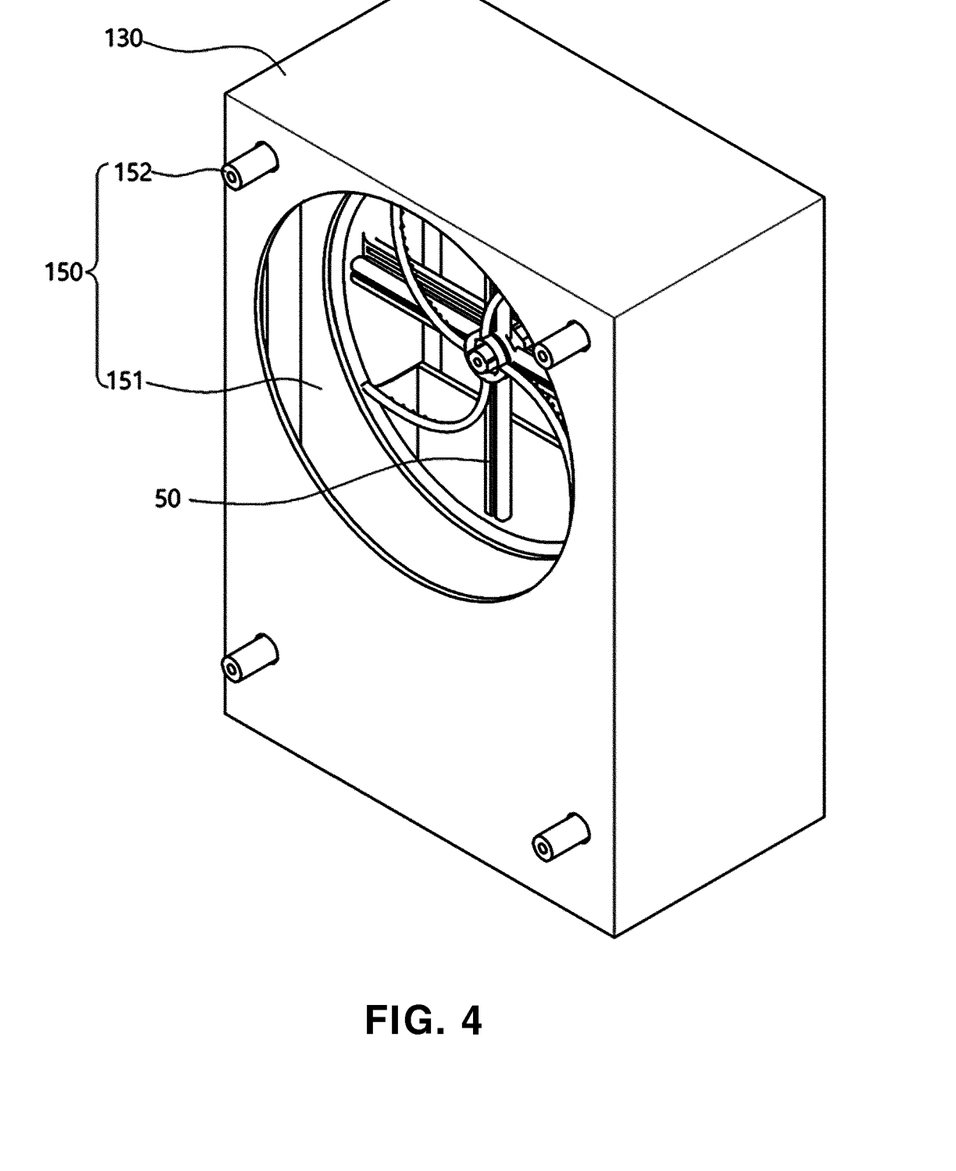
FIG. 4 is a perspective view illustrating a filter mounting part, a close contact unit, and a filter module provided in the air cleaner of FIG. 1.
Figure 6:
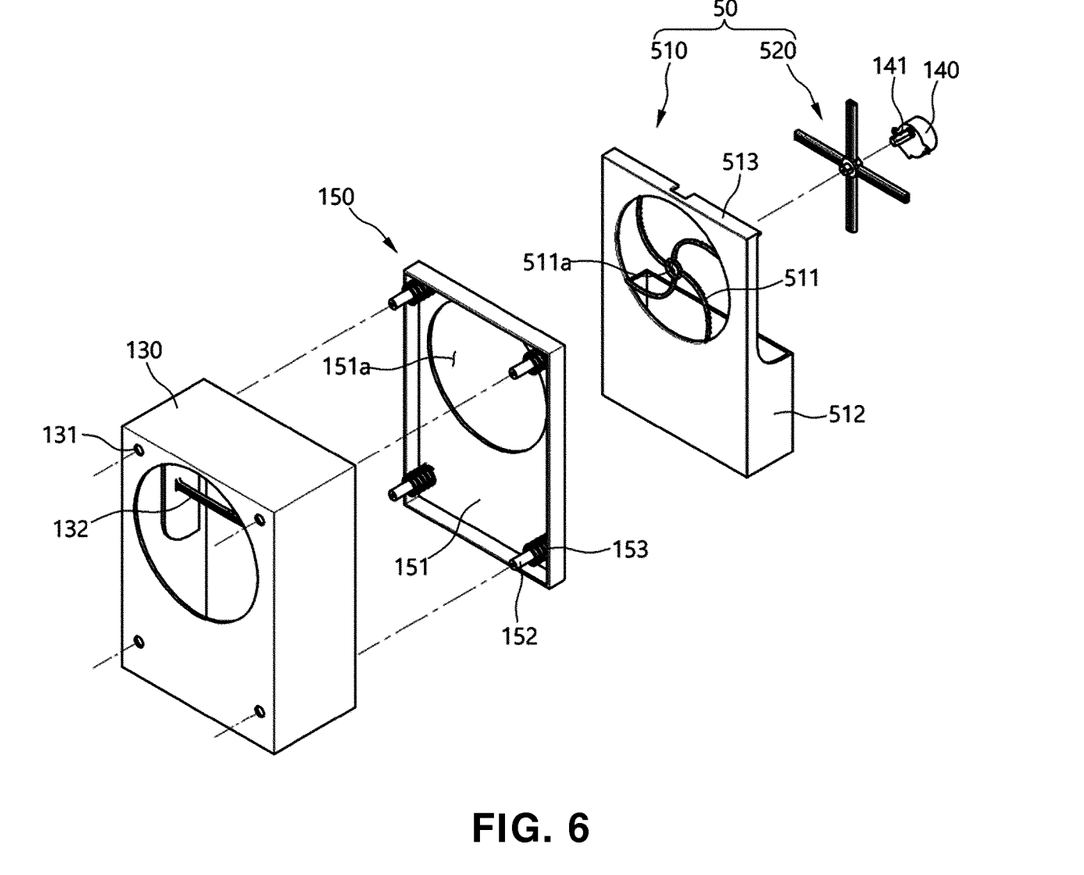
FIG. 6 is an exploded perspective view illustrating a filter mounting part, a motor, a close contact unit, and a filter module provided in the air cleaner of FIG. 1.

Hereinafter, the filter mounting part 130, the motor 140, the close contact unit 150, and the filter module 50 will be described in more detail with reference to FIGS. 4 to 6.

In the illustrated embodiment, a through hole 131 is formed in the front side of the filter mounting part 130.

The through hole 131 extends in one direction. The one direction extends in the thickness direction of the filter mounting part 130. In the illustrated embodiment, the one direction is a forward and backward direction.

A plurality of through holes 131 may be provided. In the illustrated embodiment, four through holes 131 are provided in the filter mounting part 130.

One portion of the close contact unit 150 is inserted into and coupled to the through hole 131. In this case, the one portion of the close contact unit 150 inserted into the through hole 131 may be reciprocated in the through hole 131.

A motor fixing stand 132 is formed at another portion of the filter mounting part 130 spaced apart from the through hole 131.

The motor fixing stand 132 may be coupled to the motor 140 to be described below to fix the motor 140 to a specific position inside the housing 10.

The motor fixing stand 132 is located inside the filter mounting part 130. In the illustrated embodiment, the motor fixing stand 132 extends across the empty space inside the filter mounting part 130. In this case, the motor fixing stand 132 is disposed not to collide with the filter module 50 inserted into the filter mounting part 130.

The motor 140 is coupled to one side of the motor fixing stand 132.

The motor 140 converts electric energy into mechanical energy and transmits it to the filter module 50.

The motor 140 is located inside the filter mounting part 130. In this case, the motor 140 may be coupled to the motor fixing stand 132 and fixed to a specific position of the filter mounting part 130. In the illustrated embodiment, the motor 140 is coupled to a central portion of the motor fixing stand 132.

The motor 140 includes a rotating shaft 141. The motor 140 converts electric energy into mechanical energy to rotate the rotating shaft 141.

The rotating shaft 141 may be coupled through the filter module 50 to transmit rotational power to the filter module 50. In summary, the filter module 50 may receive power from the motor 140 through the rotating shaft 141.

The close contact unit 150 moves the filter module 50 in a direction toward the motor 140 when the filter module 50 is inserted into the filter mounting part 130. In the illustrated embodiment, the close contact unit 150 may move the filter module to the rear side.

The close contact unit 150 is disposed inside the filter mounting part 130. Accordingly, it may be understood that the cross-sectional area of the close contact unit 150 in the thickness direction is smaller than the cross-sectional area of the filter mounting part 130 in the thickness direction.

One portion of the close contact unit 150 is inserted into and coupled to the through hole 131 of the filter mounting part 130. In addition, the close contact unit 150 may be reciprocated in one direction in the inner space of the filter mounting part 130. In the illustrated embodiment, the close contact unit 150 may be reciprocated in the forward and backward direction.

The close contact unit 150 is disposed between the filter mounting part 130 and the filter module 50. In the illustrated embodiment, the close contact unit 150 is disposed between the inner surface of the front side of the filter mounting part 130 and the front side surface of the filter module 50.

The close contact unit 150 is in contact with one surface of the filter module 50. In the illustrated embodiment, the close contact unit 150 is in contact with the front side surface of the filter module 50. Accordingly, the close contact unit 150 may be reciprocated in the forward and backward direction to move the filter module 50 in the forward and backward direction.

In the illustrated embodiment, the close contact unit 150 includes a pressing plate 151, a pillar part 152, and an elastic member 153.

The pressing plate 151 is a portion that is in surface contact with the filter module 50 when the filter module 50 is coupled to the filter mounting part 130 of the housing 10.

The pressing plate 151 forms an outer appearance of one side facing the filter module 50 of the close contact unit 150. In the illustrated embodiment, the pressing plate 151 forms an outer appearance of the rear side of the close contact unit 150.

The pressing plate 151 may be in surface contact with the filter module 50 and may apply a force to the filter module 50. To this end, the pressing plate 151 is preferably formed in a shape corresponding to that of the filter module 50.

In the illustrated embodiment, the pressing plate 151 is formed as a flat plate extending in the up, down, left, and right directions. However, the pressing plate 151 is not limited to the illustrated shape, and may be formed in various shapes. For example, at least a portion of the pressing plate 151 may be formed in a curved plate shape.

The pressing plate 151 is located inside the filter mounting part 130, and a cross-sectional area in a thickness direction thereof is smaller than a cross-sectional area in a thickness direction of the filter mounting part 130.

In an embodiment, the pressing plate 151 may be formed in a shape corresponding to the inner surface of the filter mounting part 130. In the embodiment above, the outer circumference of the pressing plate 151 corresponds to the inner circumference of the filter mounting part 130.

A vent 151a, which is a flow path of outside air, is formed at one portion of the pressing plate 151. The outside air flowing toward the outside air inlet 112 passes through the vent hole 151a and flows into the inner space of the housing 10.

A pillar part 152 is formed on one surface of the pressing plate 151.

The pillar part 152 guides the reciprocating direction of the pressing plate 151 and prevents arbitrary separation of the close contact unit 150 and the housing 10.

The pillar part 152 is formed to extend from one surface of the pressing plate 151 in a direction away from the motor 140. In the illustrated embodiment, the pillar part 152 is formed to extend from the front side surface of the pressing plate 151 toward the front side.

The pillar part 152 is inserted into and coupled to the through hole 131 of the filter mounting part 130. The pillar part 152 may be reciprocated in the through hole 131 along the extending direction thereof. In the illustrated embodiment, the one direction is a forward and backward direction.

The pillar part 152 may be formed in a shape corresponding to the inner circumference of the through hole 131. In the illustrated embodiment, the pillar part 152 is formed in a cylindrical shape. In the embodiment above, the diameter of the pillar part 152 is formed equal to or smaller than the diameter of the through hole 131.

However, the shape of the pillar part 152 is not limited to the illustrated shape, and may be formed in various shapes. For example, the pillar part 152 may be formed in an octagonal pillar shape.

A plurality of pillar parts 152 may be provided. In this case, the number of pillar parts 152 is equal to or smaller than the number of through holes 131. In the illustrated embodiment, four pillar parts 152 are provided.

In the illustrated embodiment, the elastic member 153 is coupled to the outer circumference of the pillar part 152.

The elastic member 153 provides an elastic force such that the pressing plate 151 moves in a direction toward the motor 140. To this end, the elastic member 153 is disposed at a position opposite to the motor 140 with respect to the pressing plate 151.

In an embodiment, the elastic member 153 may be a spring disposed to surround the outer circumference of the pillar part 152. However, the elastic member 153 is not limited to the embodiment, and may be formed in various structures capable of providing an elastic force to the pressing plate 151.

The elastic member 153 may store an elastic force through a change in the shape thereof. The elastic member 153 transmits the elastic force to the pressing plate 151. Accordingly, the filter module 50 that is in surface contact with the pressing plate 151 may also receive a force from the elastic member 153.

The elastic member 153 applies an elastic force to the pressing plate 151 in a direction toward the motor 140, and the filter module 50 receives the elastic force in a direction toward the motor 140. As a result, the filter module 50 may be moved in a direction toward the motor 140.

In the illustrated embodiment, the filter module 50 includes a detachable unit 510 and a cleaning unit 520.

The detachable unit 510 is a portion detachably coupled to the housing 10 directly from the filter module 50. Specifically, the detachable unit 510 is detachably coupled to the filter mounting part 130 of the housing 10.

When the detachable unit 510 is detached from the housing 10, the detachable unit is moved in a first direction, and when the detachable unit reaches a predetermined height, the detachable unit is moved in a second direction different from the first direction. In this case, the second direction is a direction toward the motor 140. In the illustrated embodiment, the first direction is an up-down direction, and the second direction is a forward and backward direction.

The detachable unit 510 is in surface contact with the pressing plate 151 of the close contact unit 150. In the illustrated embodiment, the detachable unit 510 is located at the rear side of the pressing plate 151 and is in surface contact with the rear side surface of the pressing plate 151.

In an embodiment, a handle part (not shown) that may be gripped by a user may be formed below the detachable unit 510.

In the illustrated embodiment, the detachable unit 510 includes a filter net 511, a dust tray 512 and a latching jaw 513.

The filter net 511 filters the air flowing toward the outside air inlet 112. To this end, the filter net 511 is disposed on the air flow path.

The filter net 511 is disposed on one surface facing the pressing plate 151 of the detachable unit 510. In the illustrated embodiment, the filter net 511 is disposed on the front side surface of the detachable unit 510.

The filter net 511 overlaps the vent 151a of the pressing plate 151 in the flow direction of the air. In the illustrated embodiment, the filter net 511 overlaps the vent 151a in the forward and backward direction. Accordingly, the air directed toward the vent 151a may first pass through the filter net 511 and then pass through the vent 151a. As a result, primarily the air filtered by the filter net 511 may be introduced into the housing 10.

In an embodiment, the filter net 511 may be formed in a mesh net structure. However, the filter net 511 is not limited to the embodiment, and may be formed in various structures capable of filtering air.

A filter net through hole 511a for coupling with a cleaning unit 520, which will be described later, is formed at the center of the filter net 511. A detailed description thereof will be described later.

The dust tray 512 is disposed below the filter net 511.

The dust tray 512 collects dust separated from the filter net 511. To this end, a space in which dust separated from the filter net 511 is collected is formed in the dust tray 512.

The dust tray 512 is located below the detachable unit 510. In an embodiment, the dust tray 512 is formed to extend downward from the filter net 511 and is integrally formed with the filter net 511. In other embodiment, the dust tray 512 is detachably coupled to a lower side of the filter net 511.

In addition, the dust tray 512 is formed to protrude in a direction away from the pressing plate 151. In the illustrated embodiment, the dust tray 512 is formed to protrude rearward. Accordingly, the inner space of the dust tray 512 may be formed at a position opposite to the pressing plate 151 with respect to the filter net 511.

This is to consider that since air flows from the filter net 511 toward the pressing plate 151, dust filtered by the filter net 511 is accumulated on a surface opposite to the pressing plate 151 of the filter net 511.

The dust separated from the filter net 511 is moved to the inner space of the dust tray 512 located below the filter net 511. Accordingly, the user may perform cleaning of the filter module 50 simply by removing the dust collected in the dust tray 512.

The latching jaw 513 may be formed to protrude from one side of the detachable unit 510.

When the filter module 50 is inserted into the housing 10, the latching jaw 513 is inserted into a latching groove 133 of the filter mounting part 130 to prevent arbitrary separation of the filter module 50. A detailed description thereof will be described later.

The cleaning unit 520 is coupled to one surface of the detachable unit 510.

Figure 7:
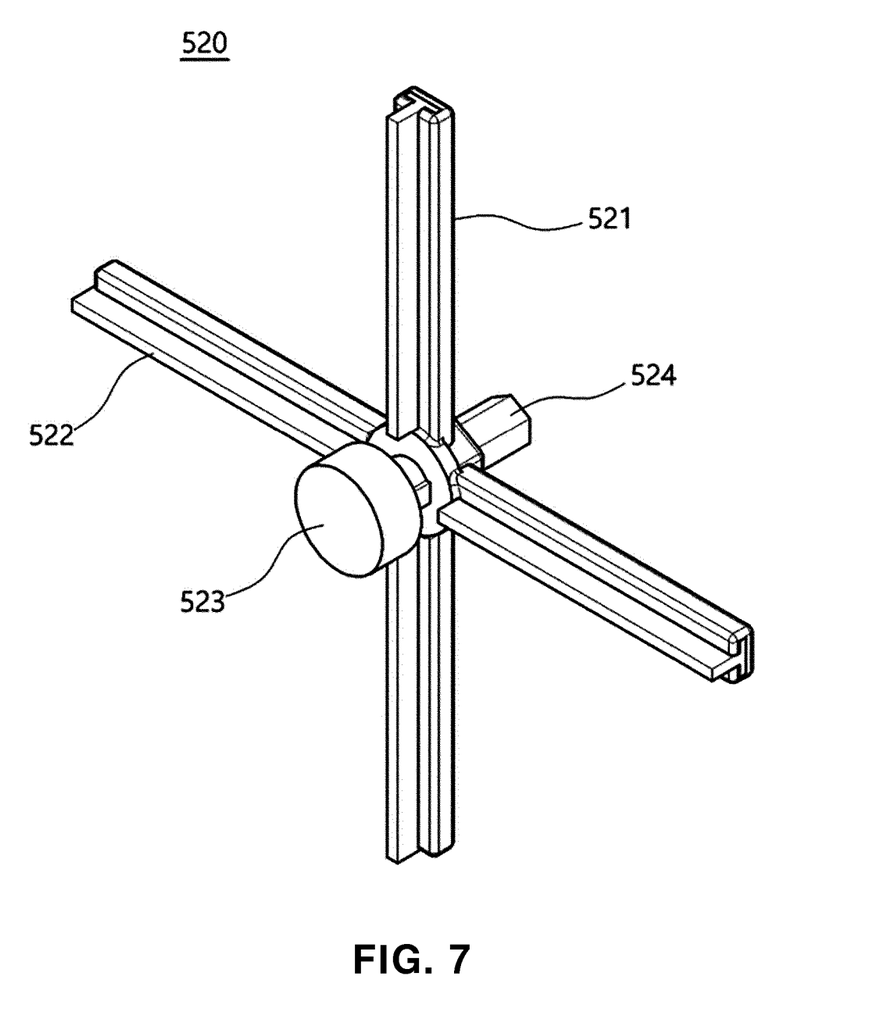
FIG. 7 is a perspective view illustrating a cleaning unit provided in the filter module of FIG. 6.
Figure 8:
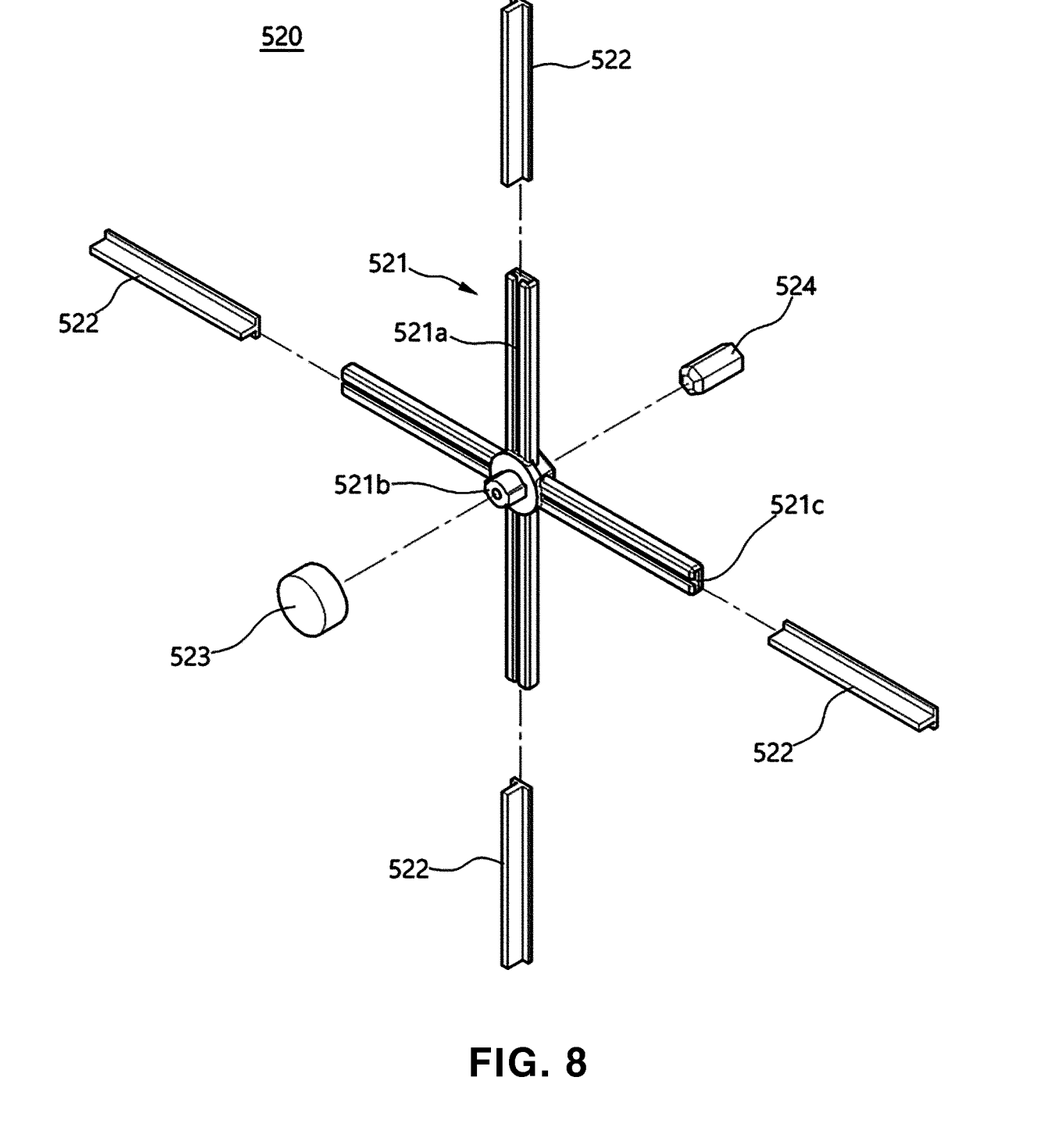
FIG. 8 is an exploded perspective view illustrating the cleaning unit of FIG. 7.

Hereinafter, the cleaning unit 520 will be described with reference to FIGS. 7 to 8.

The cleaning unit 520 directly removes dust attached to the surface of the filter net 511.

The cleaning unit 520 is disposed on a surface opposite to the pressing plate 151 of the filter net 511. In the illustrated embodiment, the cleaning unit 520 is disposed on the rear side surface of the filter net 511.

The cleaning unit 520 may be coupled to the detachable unit 510 and moved together with the detachable unit 510 when the detachable unit 510 is detached from the housing 10. When the detachable unit 510 is coupled to the housing 10, the cleaning unit 520 is detachably coupled to the motor 140 disposed in the housing 10.

The cleaning unit 520 may be moved in a direction toward the motor 140 by the pressing plate 151 when the cleaning unit 520 is detached from the motor 140. In the illustrated embodiment, the cleaning unit 520 may be moved rearward by the pressing plate 151 and may be coupled to the rotating shaft 141 of the motor 140.

In addition, the cleaning unit 520 is connected to the motor 140 and receives power from the motor 140.

The cleaning unit 520 is configured to be relatively rotatable with respect to the filter net 511 while at least a portion of the cleaning unit is in contact with the filter net

511. In this case, the cleaning unit 520 may be connected to the rotating shaft 141 of the motor 140 and may be rotated by using the rotational power received from the rotating shaft 141.

In an embodiment, the cleaning unit 520 may be selectively operated without being operated simultaneously with the fan part 40. In other embodiment, the cleaning unit 520 may be started as the fan part 40 is stopped. In another embodiment, the cleaning unit 520 may be periodically operated at preset intervals.

In the illustrated embodiment, the cleaning unit 520 includes a cleaning bar 521, a brush 522, a fixing member 523, and a motor connecting shaft 524.

The cleaning bar 521 is a portion that is directly rotated by the motor 140 in the cleaning unit 520.

The cleaning bar 521 is detachably coupled to one side of the filter net 511. In this case, the one side is in a direction opposite to the pressing plate 151 with respect to the filter net 511. In the illustrated embodiment, the cleaning bar 521 is detachably coupled to the rear side of the filter net 511.

The cleaning bar 521 is connected to the rotating shaft 141 of the motor 140 and receives rotational power through the rotating shaft 141. Accordingly, the cleaning bar 521 may rotate relative to the filter net 511 using the rotating shaft 141 as a rotating axis. In an embodiment, the rotating shaft of the cleaning bar 521 is located at the center of the cleaning bar 521.

In the illustrated embodiment, the cleaning bar 521 includes a wing part 521*a*, a bar through hole 521*b*, and a brush insertion groove 521*c*.

The wing part 521*a* extends radially outward from the rotation axis of the cleaning bar 521.

In the illustrated embodiment, the wing part 521*a* is formed in a pillar shape extending in one direction. In the embodiment above, it is preferable that the length of the wing part 521*a* be formed equal to or smaller than the radius of the filter net 511.

However, the wing part 521*a* is not limited to the illustrated shape and may be formed in various structures. For example, the wing part 521*a* may be curved and extend in a predetermined direction.

A plurality of wing parts 521*a* may be provided. In the illustrated embodiment, the cleaning bar 521 includes four wing parts 521*a*.

The bar through hole 521*b* is formed at the center of the cleaning bar 521. The fixing member 523, which will be described later, is detachably coupled to the bar through hole 521*b*. A detailed description thereof will be described later.

The brush insertion groove 521*c* for accommodating the brush 522, which will be described later, is formed in one portion of the cleaning bar 521.

The brush insertion groove 521*c* is formed at one side of the wing part 521*a*. In the illustrated embodiment, the brush insertion groove 521*c* is formed to be recessed in the front side of the wing part 521*a*.

The brush insertion groove 521*c* extends along the extending direction of the wing part 521*a*. In the illustrated embodiment, the brush insertion groove 521*c* extends along one direction. However, the brush insertion groove 521*c* is not limited to the illustrated shape and may be formed in various structures. For example, the brush insertion groove 521*c* may be curved and extend in a predetermined direction.

The brush 522 is rubbed on the surface of the filter net 511 to remove dust.

The brush 522 is coupled to one side facing the filter net 511 of the cleaning bar 521.

In the illustrated embodiment, the brush 522 is slidably and detachably coupled to the brush insertion groove 521*c* of the cleaning bar 521. Accordingly, the brush 522 may be easily separated from the cleaning bar 521 and cleaned. This facilitates maintenance of the cleaning unit 520 including the brush 522.

The brush 522 is configured to be relatively rotatable with respect to the filter net 511 while at least a portion of the cleaning unit is in contact with the filter net 511. Accordingly, dust attached to the surface of the filter net 511 may be removed from the filter net 511 when the brush 522 is rotated.

The brush 522 is formed in a shape corresponding to the wing part 521*a*, in which the brush insertion groove 521*c* is formed. In the illustrated embodiment, the brush 522 is formed to extend in one direction to correspond to the wing part 521*a* extending in the one direction. In an embodiment not shown, the brush 522 is curved and extends in a predetermined direction to correspond to the wing part 521*a* that is curved and extends in the predetermined direction.

The brush 522 may be formed of a flexible material having a high coefficient of friction. For example, the brush 522 may be formed of a synthetic rubber resin or silicone material.

A plurality of brushes 522 may be provided. In this case, the number of brushes 522 is preferably the same as the number of wing parts 521*a*. In the illustrated embodiment, the cleaning unit 520 includes four brushes 522.

The cleaning bar 521 coupled to the brush 522 may be coupled to the filter net 511 by the fixing member 523.

The fixing member 523 fixes the cleaning bar 521 to the filter net 511.

The fixing member 523 is coupled with the cleaning bar 521 and the filter net 511 interposed therebetween. In this case, one portion of the fixing member 523 is inserted into and coupled to the bar through hole 521*b* of the cleaning bar 521, and the other portion is inserted into and coupled to the filter net through hole 511*a* of the filter net 511. Accordingly, the cleaning bar 521 is rotatable relative to the filter net 511 about the bar through hole 521*b*, to which the fixing member 523 is coupled.

In an embodiment, the fixing member 523 may have a bolt coupling structure.

However, the fixing member 523 is not limited to the embodiment, and may be formed in various structures capable of coupling the cleaning bar 521 to the filter net 511.

The motor connecting shaft 524 is coupled to the other side of the cleaning bar 521.

The motor connecting shaft 524 is a portion into which the rotating shaft 141 of the motor 140 is inserted and coupled in the cleaning unit 520.

The motor connecting shaft 524 may receive rotational power from the rotating shaft 141 and may be rotated together with the rotating shaft.

In addition, the motor connecting shaft 524 is coupled to the center of the cleaning bar 521. The cleaning bar 521 may be rotated together with the motor connecting shaft 524 when the motor connecting shaft 524 is rotated. Accordingly, the cleaning bar 521 may be rotated together with the rotating shaft 141 through the motor connecting shaft 524 when the rotating shaft 141 is rotated.

The motor connecting shaft 524 is formed in a shape corresponding to that of the rotating shaft 141. In an embodiment, the inner circumference of the motor connecting shaft 524 may be formed in a shape corresponding to the outer circumference of the rotating shaft 141. For example, the inner circumference of the motor connecting shaft 524 and the outer circumference of the rotating shaft 141 may be formed in an octagonal pillar shape corresponding to each other.

The structure and each component of the air cleaner 1 according to the embodiment of the present disclosure have been described above. Hereinafter, a process of detaching the filter module 50 and the housing 10 will be described with reference to FIG. 9.

Figure 9:
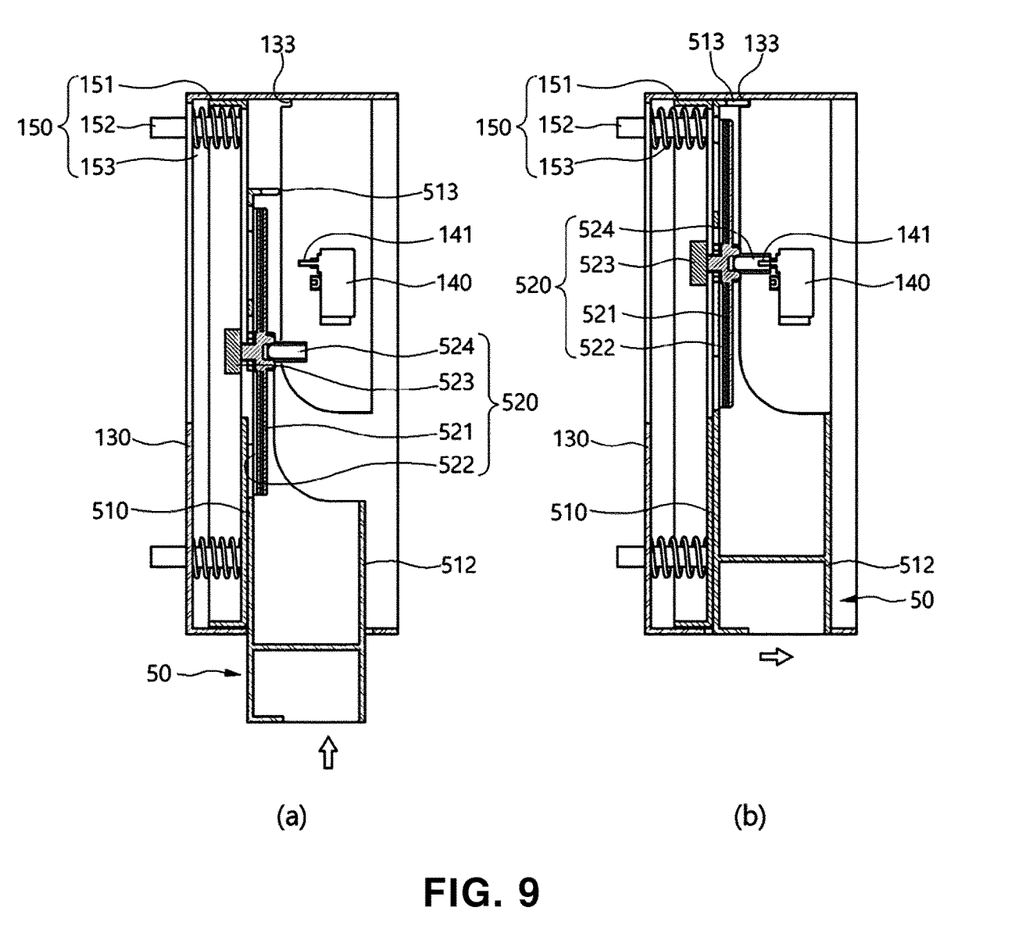
FIG. 9 is a side cross-sectional view illustrating a process of detaching a filter module and a housing according to an exemplary embodiment of the present disclosure.

FIG. 9(*a*) illustrates a first direction movement of the filter module 50.

As described above, the filter module 50 is detachably coupled to the filter mounting part 130 of the housing 10. When the detachable unit 510 of the filter module 50 is inserted into the housing 10, the detachable unit 510 is moved in a first direction, upward in the illustrated embodiment.

When the detachable unit 510 moving in the first direction reaches a predetermined height, the detachable unit 510 starts to be moved by the pressing plate 151 in a second direction different from the first direction, rearward in the illustrated embodiment.

FIG. 9(*b*) illustrates a second direction movement of the filter module 50.

When the latching jaw 513 of the detachable unit 510 reaches the same height as the latching groove 133 of the filter mounting part 130, the latching jaw 513 is engaged and inserted into the latching groove 133 by the close contact unit 150. Accordingly, the latching jaw 513 may prevent arbitrary separation of the filter module 50 inserted into the filter mounting part 130.

The latching groove 133 is formed in a shape corresponding to the latching jaw 513. In an embodiment, an inclination bent toward the latching groove 133 may be formed at a peripheral portion of the latching groove 133. In the embodiment above, the latching jaw 513 may be separated from the latching groove 133 even with a small force due to the inclination.

As described above, the pressing plate 151 receives an elastic force to be moved in a direction toward the motor 140 by the elastic member 153. Accordingly, the pressing plate 151 moves the detachable unit 510 in a direction toward the motor 140 when the detachable unit 510 is coupled to the housing 10. That is, the detachable unit 510 is moved in the second direction.

In the above process, the rotating shaft 141 of the motor 140 is inserted into the motor connecting shaft 524 of the cleaning unit 520. Therefore, the cleaning unit 520 of the filter module 50 and the motor 140 may be detached by the pressing plate 151 even with a small force. Accordingly, the filter module 50 and the housing 10 may be more easily detached. At the same time, when the filter module 50 and the housing 10 are coupled to each other, arbitrary separation of the filter module 50 may be prevented.

Hereinafter, a cleaning process of the filter module 50 will be described with reference to FIG. 10.

Figure 10:
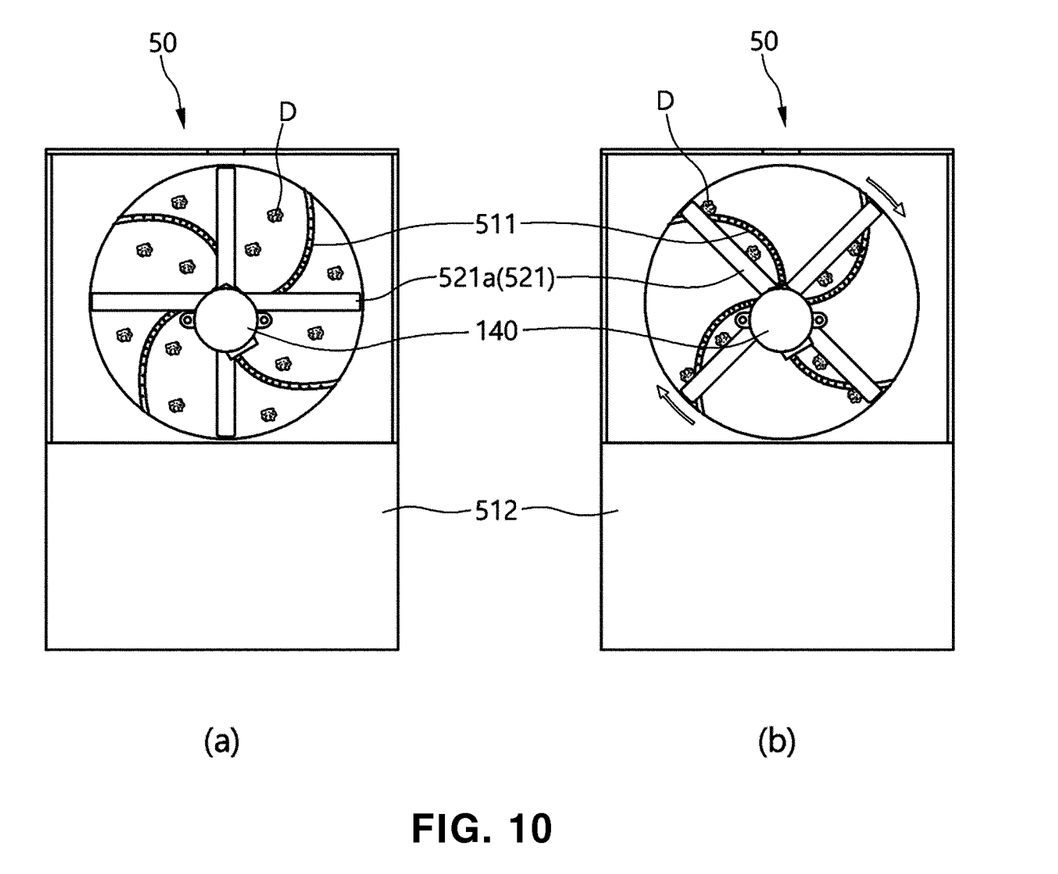
FIG. 10 is a rear view illustrating a cleaning process of a filter module according to an exemplary embodiment of the present disclosure.

FIGS. 10(*a*) and 10(*b*) respectively illustrate a state before and after cleaning of the filter module 50.

As the operation time of the air cleaner 1 elapses, dust D in the air filtered by the filter net 511 is accumulated on the surface of the filter net 511.

Before the cleaning unit 520 is driven, the brush 522 inserted into the cleaning bar 521 maintains a stationary state in contact with the surface of the filter net 511. Thereafter, when the cleaning unit 520 is operated, the cleaning bar 521 is rotated by receiving rotational power from the motor 140.

The brush 522 inserted into the cleaning bar 521 is rubbed with the surface of the filter net 511 and rotated together with the cleaning bar 521. Accordingly, the dust D attached to the surface of the filter net 511 may be automatically removed from the filter net 511 by the frictional force.

The dust D separated from the filter net 511 is moved to the inner space of the dust tray 512 located below the filter net 511. Accordingly, the user may perform cleaning of the filter module 50 simply by removing the dust D collected in the dust tray 512. As a result, the cleaning convenience of the filter module 50 may be further improved, and the cleanliness of the filter module 50 may be maintained even at normal times.

Although the present disclosure has been described above with reference to preferred exemplary embodiments thereof, the present disclosure is not limited to the configurations of the above-described embodiments.

In addition, the present disclosure may be variously modified and changed without departing from the spirit and scope of the present disclosure described in the following claims by those skilled in the art to which the present disclosure pertains.

Furthermore, the embodiments may be configured by selectively combining all or some of the embodiments so that various modifications may be made thereto.

What is claimed is:

1. An air cleaner, comprising:
a housing in which an inlet and an outlet of air are formed; and
a filter module disposed at one side of the inlet to filter air flowing toward the inlet,
wherein the filter module comprises:
a detachable unit having a filter net at a portion thereof and detachably coupled to the housing; and
a cleaning unit configured to be relatively rotatable with respect to the filter net while at least a portion of the cleaning unit is in contact with the filter net, and
wherein the cleaning unit is detachably coupled to a motor disposed in the housing when the detachable unit is coupled to the housing,
wherein the filter module is, as a single integrated module, inserted into the housing and detached from the housing, and
the detachable unit is moved in a first direction and the cleaning unit is moved in a second direction different from the first direction when inserted into the housing as the single integrated module.

2. The air cleaner of claim 1, wherein the housing comprises a close contact unit configured to move the detachable unit in a direction toward the motor when the detachable unit is coupled to the housing.

3. The air cleaner of claim 2, wherein the close contact unit comprises:
a pressing plate which is in surface contact with the detachable unit when the detachable unit is detached from the housing; and
an elastic member which provides an elastic force to move the pressing plate in a direction toward the motor.

4. The air cleaner of claim 3, wherein:
the pressing plate comprises a pillar part formed extending from one surface of the pressing plate in a direction away from the motor, and
the elastic member is a spring disposed to surround an outer circumference of the pillar part.

5. The air cleaner of claim 1, wherein the cleaning unit further comprises:
   a cleaning bar detachably coupled to the filter net and connected to the motor to be rotatable; and
   a brush configured to be coupled to one side of the cleaning bar facing the filter net and rotatable together with the cleaning bar when the cleaning bar is rotated, and be relatively rotatable with respect to the filter net while at least a portion of the brush is in contact with the filter net.

6. The air cleaner of claim 5, wherein the brush is slidably and detachably coupled to the cleaning bar.

7. The air cleaner of claim 5, wherein the cleaning unit comprises a fixing member coupled with the cleaning bar and the filter net interposed therebetween.

8. The air cleaner of claim 5, wherein the cleaning bar comprises a plurality of wing parts extending radially outward from a rotation axis.

9. The air cleaner of claim 1, wherein the detachable unit comprises a dust tray disposed below the cleaning unit and having a space therein in which dust separated from the filter net is collected.

10. The air cleaner of claim 9, wherein the dust tray is formed to extend downward from the filter net and is integrally formed with the filter net.

11. The air cleaner of claim 9, wherein the dust tray is detachably coupled to a lower side of the filter net.

12. The air cleaner of claim 1, wherein the cleaning unit comprises a motor connecting shaft into which a rotating shaft of the motor is inserted and coupled, and rotatable together with the rotating shaft when the rotating shaft is rotated.

* * * * *